United States Patent
Raymond et al.

(10) Patent No.: US 10,616,988 B2
(45) Date of Patent: Apr. 7, 2020

(54) ELECTROMECHANICAL LINEARLY ACTUATED ELECTRODE

(71) Applicant: The ESAB Group Inc., Florence, SC (US)

(72) Inventors: Andrew Raymond, Lebanon, NH (US); David A. Tatham, Enfield, NH (US); Leonid Pekker, Plainfield, NH (US); Daniel A. Cote, Hartland, VT (US); Geoffrey H. Putnam, Charlestown, NH (US); Ryan Lynaugh, Cornish, NH (US)

(73) Assignee: The ESAB Group Inc., Florence, SC (US)

( * ) Notice: Subject to any disclaimer, the term of this patent is extended or adjusted under 35 U.S.C. 154(b) by 351 days.

(21) Appl. No.: 15/628,278

(22) Filed: Jun. 20, 2017

(65) Prior Publication Data
US 2018/0368246 A1    Dec. 20, 2018

(51) Int. Cl.
*B23K 10/00* (2006.01)
*H05H 1/34* (2006.01)
*H05H 1/32* (2006.01)

(52) U.S. Cl.
CPC .............. *H05H 1/34* (2013.01); *B23K 10/006* (2013.01); *H05H 1/32* (2013.01);
(Continued)

(58) Field of Classification Search
CPC .... H05H 1/34; H05H 1/32; H05H 2001/3426; H05H 2001/3457; H05H 2001/3489; B23K 10/006
(Continued)

(56) References Cited

U.S. PATENT DOCUMENTS

| | | | | | |
|---|---|---|---|---|---|
| 3,004,189 A | * | 10/1961 | Giannini | .............. | H05H 1/34 315/111.21 |
| 4,766,287 A | * | 8/1988 | Morrisroe | .............. | H05H 1/30 219/121.48 |

(Continued)

FOREIGN PATENT DOCUMENTS

| | | |
|---|---|---|
| JP | H03133099 A | 6/1991 |
| JP | H10166155 | 6/1998 |
| WO | 2008131606 A1 | 11/2008 |

OTHER PUBLICATIONS

Notification of Transmittal of International Search Report and Written Opinion, including International Search Report and Written Opinion, for International Application No. PCT/US2018/037472 dated Aug. 28, 2018, 16 pages.

*Primary Examiner* — Mark H Paschall
(74) *Attorney, Agent, or Firm* — Edell, Shapiro & Finnan, LLC

(57) ABSTRACT

Approaches herein provide a plasma arc torch including a tip surrounding an electrode, the electrode having a proximal end and a distal end, and a shield surrounding the tip, the shield including an exit orifice proximate the distal end of the electrode. The torch may further include a linear actuating device coupled to the electrode for actuating the electrode such that the distal end of the electrode moves axially relative to the tip and the exit orifice of the shield. In some approaches, the linear actuating device is operable to actuate the electrode along a central longitudinal axis extending through the tip. In some approaches, the linear actuating device may include one of: a micro linear drive motor, a micro linear stepper motor, a voice coil, a solenoid coil, and a magnetostrictive actuator. In some approaches, the electrode is actuated during a welding or cutting cycle of the torch.

23 Claims, 8 Drawing Sheets

(52) U.S. Cl.
CPC ............... *H05H 2001/3426* (2013.01); *H05H 2001/3457* (2013.01); *H05H 2001/3489* (2013.01)

(58) Field of Classification Search
USPC ........ 219/121.5, 121.51, 121.52, 75, 121.39, 219/121.48
See application file for complete search history.

(56) References Cited

U.S. PATENT DOCUMENTS

| | | |
|---|---|---|
| 5,166,494 A | 11/1992 | Luo |
| 5,208,441 A | 5/1993 | Broberg |
| 5,538,765 A | 7/1996 | Kurihara et al. |
| 5,756,960 A | 5/1998 | Rogozinski |
| 5,796,067 A * | 8/1998 | Enyedy .................. B23K 10/00 219/121.52 |
| 5,844,196 A | 12/1998 | Oakley |
| 5,951,888 A | 9/1999 | Oakley |
| 7,084,367 B2 | 8/2006 | Sommerfeld |
| 7,872,207 B2 * | 1/2011 | Bijker ...................... H05H 1/34 219/121.48 |
| 8,101,882 B2 | 1/2012 | Mather |
| 8,525,069 B1 | 9/2013 | Mather |
| 8,541,710 B2 | 9/2013 | Brandt |
| 8,809,728 B2 | 8/2014 | Brandt |
| 2006/0163216 A1 | 7/2006 | Brandt |
| 2006/0186094 A1 | 8/2006 | Krink |
| 2008/0245775 A1 | 10/2008 | Opderbecke |
| 2011/0284504 A1 | 11/2011 | Michon |
| 2012/0292296 A1 | 11/2012 | Griffin |
| 2014/0027411 A1 | 1/2014 | Voronin |

* cited by examiner

ELECTROMECHANICAL LINEARLY ACTUATED ELECTRODE

FIELD OF THE DISCLOSURE

The present disclosure relates generally to plasma arc torches and, more particularly, to devices and methods for linearly actuating an electrode of a plasma arc torch.

DISCUSSION OF RELATED ART

Plasma devices, such as plasma arc torches, may be used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip has a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Ionized gas is then blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

Current approaches include a non-adjustable fixed position electrode, or a fixed position electrode changeable only by manually adjusting the electrode, which may require partial disassembly of the torch. For example, in current designs the electrode setback may be fixed with a threaded locking device against a collet and adjoining collet body. With this design, to adjust the electrode setback requires shut down of the torch and subsequent system restart.

SUMMARY OF THE DISCLOSURE

In view of the foregoing, in one approach, a plasma arc torch includes a tip surrounding an electrode, the electrode having a proximal end and a distal end, and a shield surrounding the tip, the shield including an exit orifice proximate the distal end of the electrode. The plasma arc torch may further include a linear actuating device coupled to the electrode or the tip for actuating the electrode or the tip such that the distal end of the electrode moves axially relative to the exit orifice of the shield.

In another approach, a plasma arc system includes a plasma arc torch having an electrode surrounded by a tip, the electrode including a proximal end and a distal end, and a shield surrounding the tip, the shield including an exit orifice proximate the distal end of the electrode. The plasma arc system further includes a linear actuating device coupled to the electrode or the tip for adjusting a relative position of the electrode and the tip along a central longitudinal axis, wherein the central longitudinal axis extends through a central bore of the tip.

In yet another approach, a method includes providing a plasma arc torch including an electrode surrounded by a tip, the electrode having a proximal end and a distal end. The method further includes providing a shield surrounding the tip, the shield including an exit orifice proximate the distal end of the electrode, and actuating, by a linear actuating device, the electrode or the tip along a central longitudinal axis extending through a bore of the tip.

BRIEF DESCRIPTION OF THE DRAWINGS

The accompanying drawings illustrate exemplary approaches of the disclosure, and in which.

Figure 1:
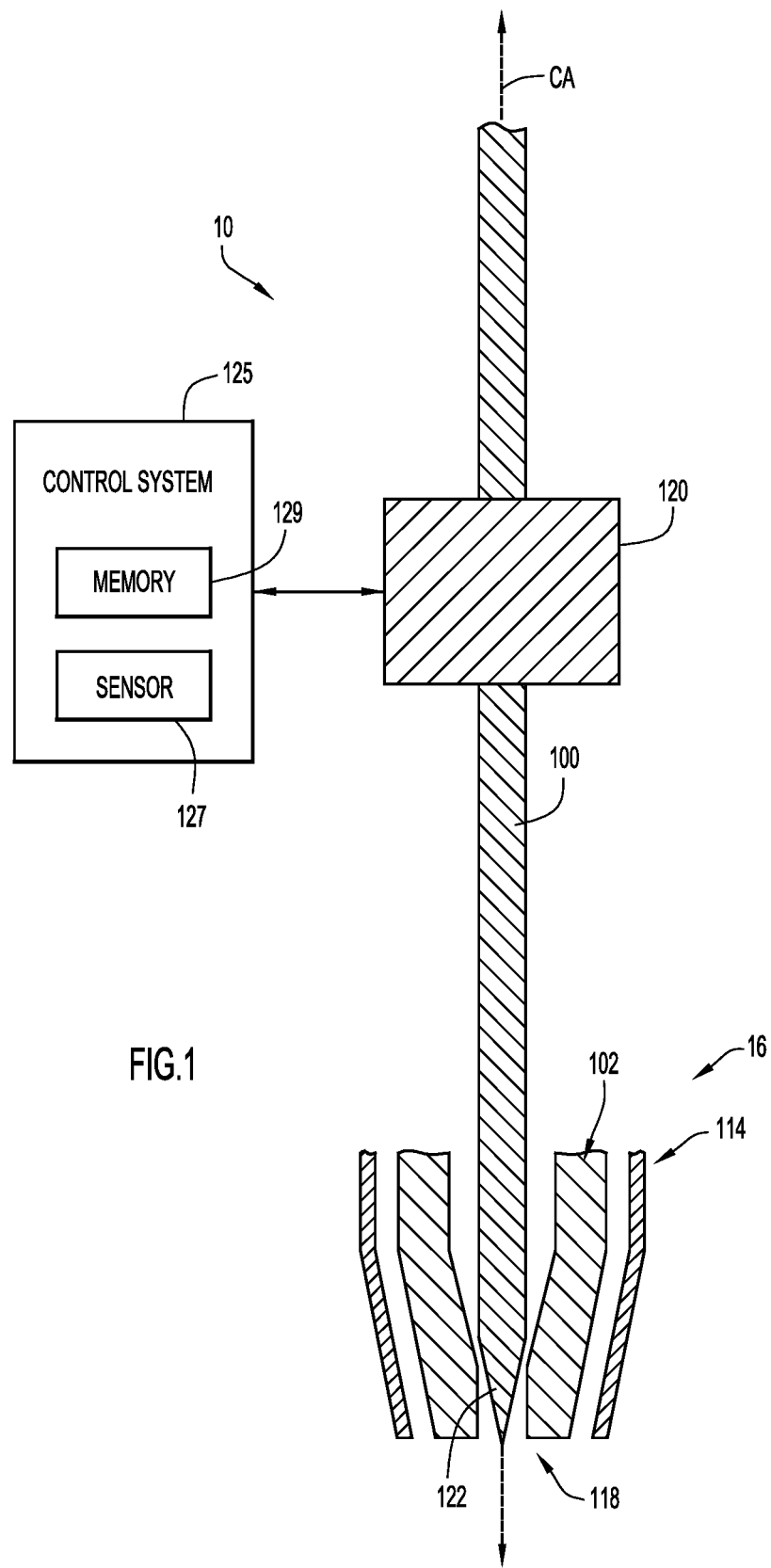
FIG. 1 is a side cutaway view of a plasma arc torch of according to exemplary embodiments of the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," "on," "over," and the like, may be used herein for ease of describing one element's relationship to another element(s) as illustrated in the figures. It will be understood that the spatially relative terms may encompass different orientations of the device in use or operation in addition to the orientation depicted in the figures.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

As described above, in prior art cutting systems, it is difficult to reliably start an arc and to detect of end-of-life of the cathode and nozzle. Existing plasma cutting systems using contact start provide contact between the cathode and anode to initiate an arc to start the cutting process. Successful initiation of an arc in a system is a function of relative motion between the cathode and the anode, as well as the flowrate of gas into the plasma chamber. The arc is created by bridging the stationary gap between the cathode and the anode with another conductor. The anode-cathode gap is created by an increase in the gas pressure in the arc chamber until the conductor or moving cathode moves from the anode, and drawing an arc between the cathode and anode. The gas flow pushes the arc through the nozzle, translating it to the workpiece.

There is a balance between the mass flow of the gas and the speed that the cathode moves from the anode. In some cases, the arc can be extinguished or it will require so much power to sustain the arc that it can lead to wearing the anode and/or cathode prematurely. Another issue that exists with contact start is using standard air, which results in an oxide layer build-up on the anode and cathode, and which insulates the anode/cathode, causing premature end-of-life.

To address this need, embodiments herein provide a linear actuated electrode/emissive element. The actuation of the emissive element may control the gas flow (e.g., gas pressure in the plasma chamber) and the cathode position relative to the nozzle. This may allow for gas flow to be a function of position, and increases the ability to maintain plasma arcs for a wide variety of flow ranges by reducing the voltage requirements at any gap, while allowing power supplies to increase current at any particular power level as a function of the distance between the cathode and anode. Furthermore, end-of-life can be determined by measuring the position of the emissive element relative to the cathode and anode for a given power level and/or current.

Furthermore, cathode position sensing can be incorporated into the design to enable precise position control to be able to correlate the cathode position to part wear and consumption. Methods used to determine the position of the cathode may include linear and rotary potentiometers, linear variable differential transformer (LVDT), absolute encoder, relative encoder, capacitive, opto, HAL, and other magnetic field sensors that vary an output voltage in response to a magnetic field.

Figure 2:
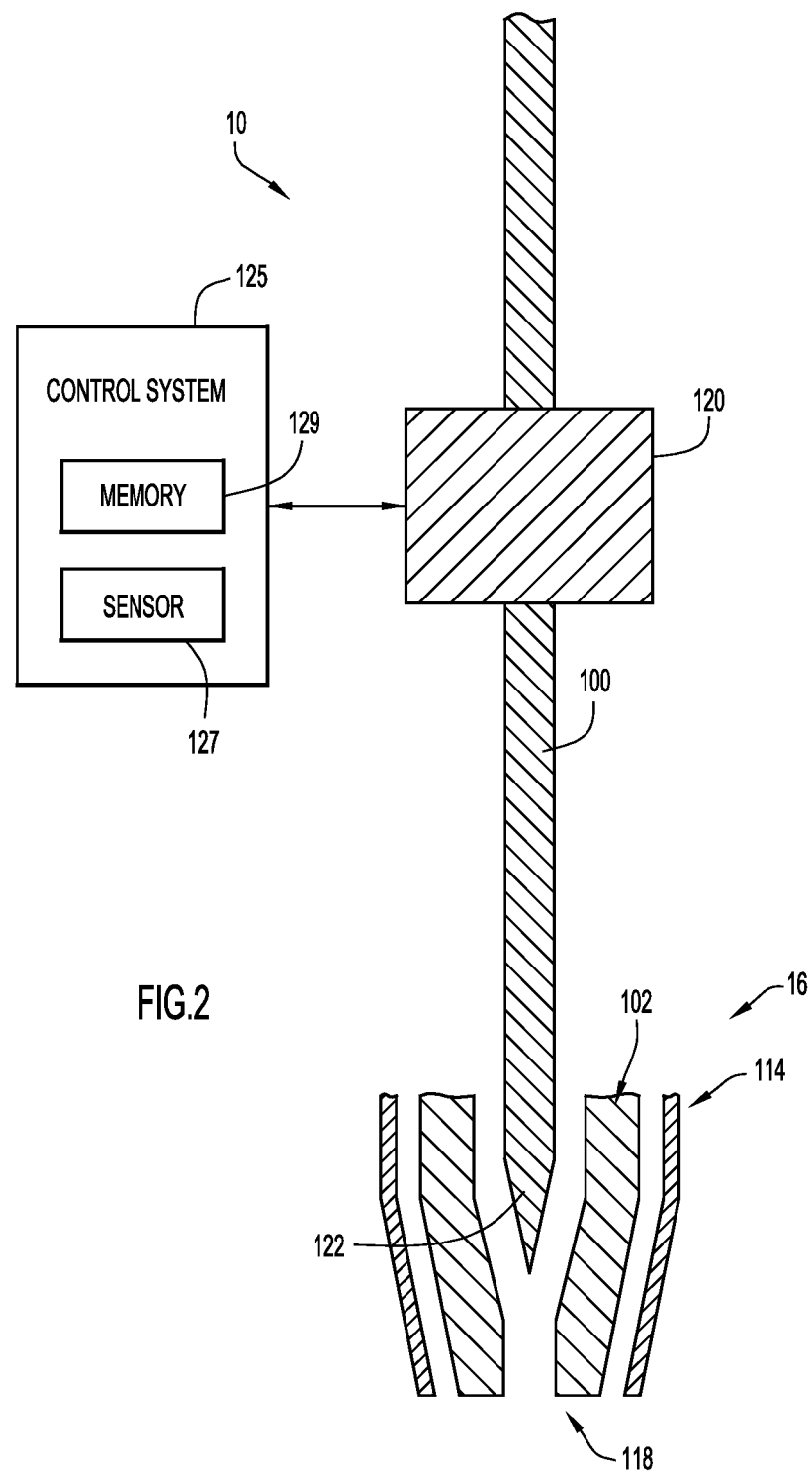
FIG. 2 is a side cutaway view of the plasma arc torch of FIG. 1 according to exemplary embodiments of the disclosure.

Referring to FIGS. 1-2, a plasma arc torch (hereinafter "torch") 10 according to embodiments of the disclosure will be described in greater detail. As used herein, a plasma arc torch should be construed by those skilled in the art to be an apparatus that generates or uses plasma for cutting, welding, spraying, gouging, or marking operations, among others, whether manual or automated. Accordingly, specific reference to plasma arc cutting torches or plasma arc torches should not be construed as limiting the scope of the present disclosure. Furthermore, the specific reference to providing gas to a plasma arc torch should not be construed as limiting the scope of the present disclosure, such that other fluids, e.g. liquids, may also be provided to the plasma arc torch in accordance with the teachings of the present disclosure.

As shown, the torch 10 includes one or more consumables 16, such as an electrode 100, a tip 102, and a shield cap or shield 114. The shield 114 may include an exit orifice 118 proximate a distal end 122 of the electrode 100. It will be appreciated that the torch 10 typically includes other components as well, which are not shown for the sake of brevity and ease of explanation. The torch 10 may further include a linear actuating device 120 coupled to the electrode 100 or the tip 102 for actuating the electrode 100 or the tip 102 such that the distal end 122 of the electrode 100 moves axially (e.g., linearly upwards/downwards) relative to the exit orifice 118 of the shield 114. More specifically, the linear actuating device 120 is operable to actuate the electrode 100 along a central longitudinal axis 'CA' extending through a central bore of the tip 102 and the electrode 100. As will be described in greater detail below, the linear actuating device 120 may include one of: a micro linear drive motor, a micro linear stepper motor, a voice coil, a solenoid coil, or a magnetostrictive actuator.

In some embodiments, the torch 10 may include a control system 125 operable with the torch 10, e.g., operable with the linear actuation device 120 and/or the electrode 100. Specifically, the control system 125 may include a sensor 127 configured to receive a voltage generated from the electrode 100, and/or to receive an indication of a position of the distal end 122 of the electrode 100 relative to the exit orifice 118 of the shield 114. In one example, the sensor 127 may specifically monitor a position and or size of an emissive insert of the electrode 100. In some embodiments, the control system 125 may retrieve historical electrode position data from memory 129, and then compare the received output to the historical electrode position data. The control system 125 is then configured to detect degradation of the electrode 100 in the case the output deviates from the historical electrode position data by a predetermined amount. Based on a level of degradation, end-of-life may be determined and/or predicted. This can be stored in memory 129 and communicated to an operator of the torch 10.

In some embodiments, the control system 125 may be an expert system in the plasma arc torch 10 or in a remote computer. The control system 125 may include a processing component for processing or performing logic operations for one or more components of the plasma arc torch 10. The processing component may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some embodiments, the processing component may include common computing elements, such as multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

As shown in FIG. 1, the linear actuating device 120 may cause the electrode 100 to move distally towards the exit orifice 118, for example, until the electrode 100 makes direct physical contact with the tip 102. As shown in FIG. 2, the linear actuating device 120 may cause the electrode 100 to move proximally away from the exit orifice 118 such that a gap between the electrode 100 and the tip 102 increases. During operation of the torch 10, the electrode 100 and the tip 102 are may be brought into contact during an arc start mode. Meanwhile, during an operating mode, the electrode 100 and the tip 102 may be separated from one another. Unlike previous designs employing a fixed, threaded back clamp and collet, embodiments of disclosure allow the electrode 100 to be moved between maximum and minimum set back positions without shutting down the system. This may allow changing the position of the electrode 100 in relation to the tip 102 even during the welding cycle, which changes the focal point of the welding arc making it possible to change from a deep penetrating type weld (i.e., "keyhole" mode) to a soft surface fusion type weld (i.e., "melt in" mode) on the fly.

Figure 3A:
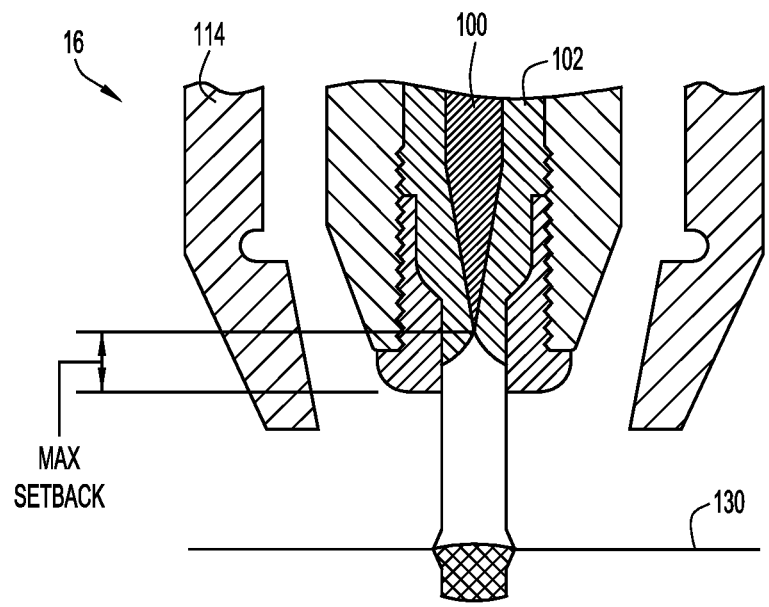
FIGS. 3A-B are side cutaway views of a welding operation of the plasma arc torch of FIG. 1 according to exemplary embodiments of the disclosure.
Figure 3B:
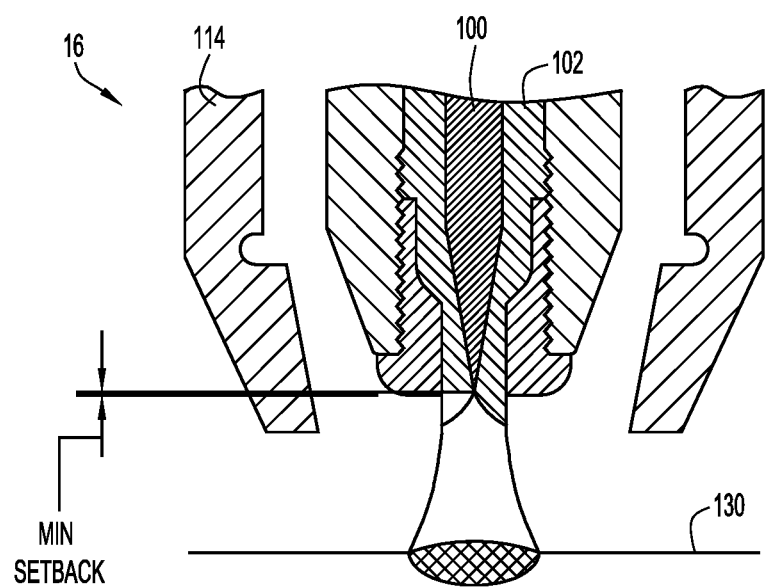

FIGS. 3A-B show the effect on plasma shape by changing the setback of the electrode 100. For example, FIG. 3A demonstrates a max set back position of the electrode 100 relative to the tip 102, which provides a focused/deep penetrating weld to a workpiece 130. Meanwhile, FIG. 3B demonstrates a minimum set back position of the electrode 100, which corresponds to a surface fusion weld to the workpiece 130. As stated above, it is possible to transition between each maximum and minimum set back positions without powering down the torch 10.

In some embodiments, the control system 125 may be coupled with gas and amperage settings/controls of the torch 10. These settings may be variable across a range of acceptable parameters and may be recalled by job number or other identifier. This provides a more repeatable shape of the arc, as well as more precise gas and current control in order to further optimize arc characteristics for a particular material and/or joint design.

Figure 4:
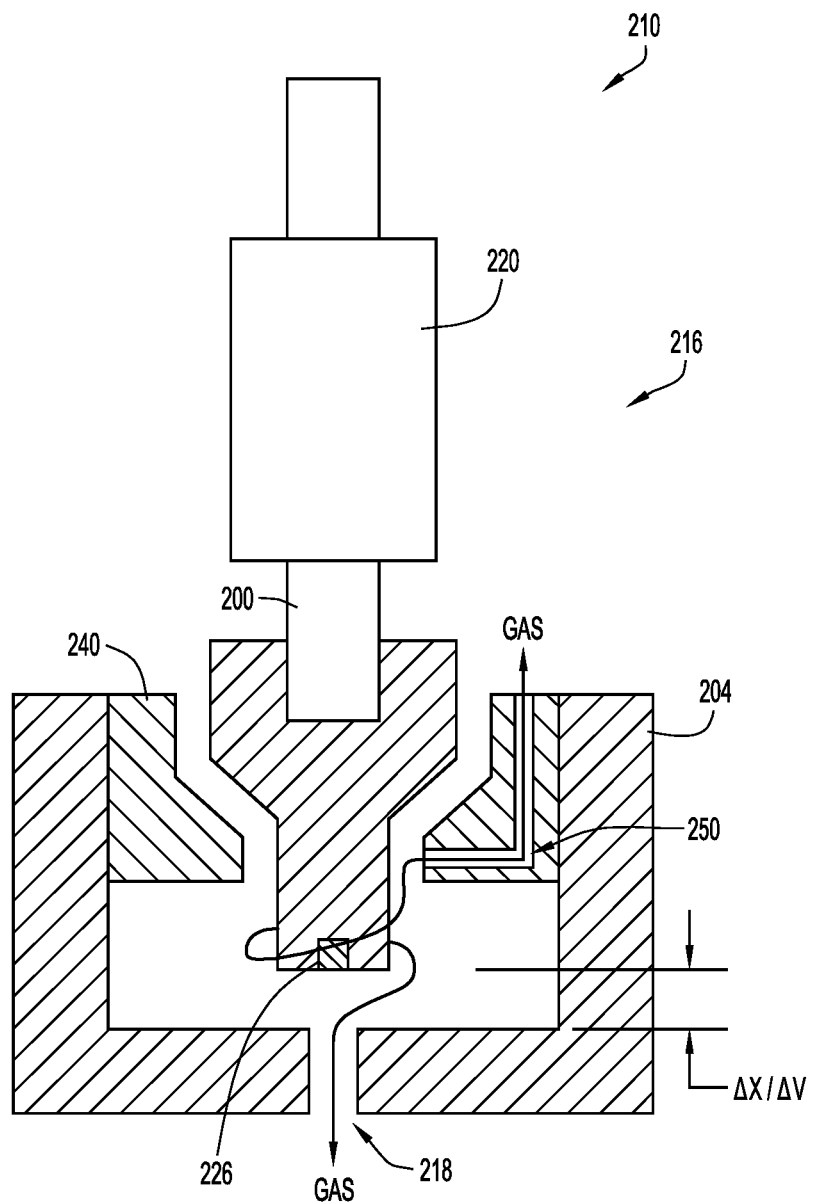
FIG. 4 is a side view of a linear actuating device and consumables of a plasma arc torch according to exemplary embodiments of the disclosure.

Referring now to FIG. 4, a side cutaway view of one or more consumables 216 of a torch 210 will be described in greater detail. As shown, the consumables 216 may include an electrode 200, a nozzle 204, and a spacer 240. The torch 210 may further include a linear actuating device 220 directly coupled to the electrode 200. As further shown, the spacer 240 may include one or more fluid passageways 250 formed therein to permit a gas to flow through the consumables 216.

In some embodiments, the electrode 200 may be made of an erodible material, such as tungsten, copper, a copper alloy, silver, or a silver alloy. Furthermore, the electrode 200 may define a bore at a distal end thereof, the bore configured in some embodiments to receive an emissive element 226, which may be made of an erodible material, such as hafnium, a hafnium alloy, zirconium, a zirconium alloy, or other material known in the art and having suitable characteristic. In some cases, the emissive element 226 may be in the form of a circular rod, which is press fit, brazed, or otherwise embedded into the bore of the electrode 200. The emissive element 226 may be concentrically disposed. During use, the linear actuating device 220 may actuate the emissive element 226 by a distance $\Delta x/\Delta v$ relative to the exit orifice 218 of the nozzle 204.

In some embodiments, the linear actuating device 220 is a micro linear drive motor configure to actuate the emissive element 226 to control gas flow through the fluid passageway 250 and/or the exit orifice 218, as well as to control a position of the anode (e.g., the electrode 200 and the emissive element 226) relative to the cathode (e.g., the nozzle 204). This may allow for gas flow to be a function of position, and increases the ability to maintain plasma arcs for a wide variety of flow ranges by reducing the voltage requirements at any gap, while allowing power supplies to increase current at any particular power level as a function of the distance between the cathode and anode. End-of-life can be determined by measuring the position of the emissive element 226 relative to nozzle 204 to maintain a power level at a given current. The actuation of the emissive element 226 can enhance starting by giving the torch 210 a method of clearing oxide layers by rapidly cycling the emissive element 226.

Figure 5:
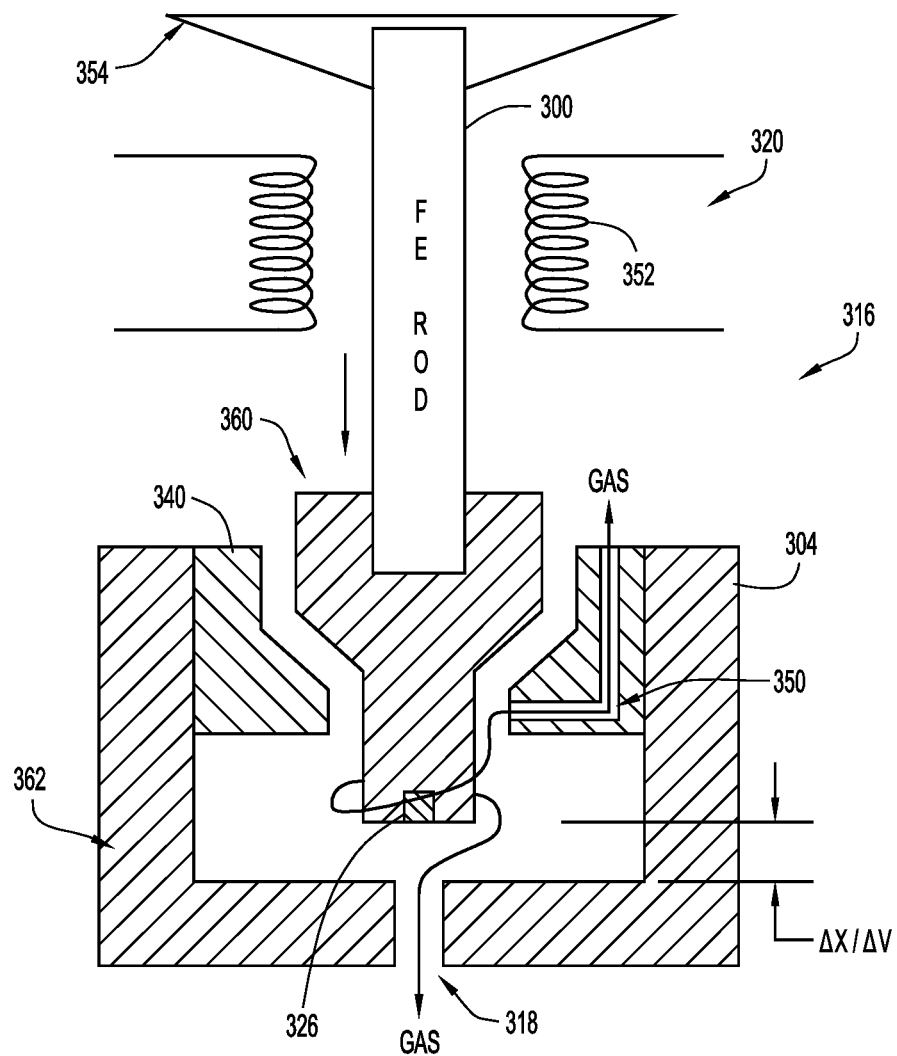
FIG. 5 is a side view of a linear actuating device and consumables of a plasma arc torch according to exemplary embodiments of the disclosure.

Referring now to FIG. 5, a side cutaway view of one or more consumables 316 of a torch 310 will be described in greater detail. As shown, the consumables 316 may include a plurality of consumables including an electrode 300, a nozzle 304, and a spacer 340. The torch 310 may further include a linear actuating device 320 directly coupled to the electrode 300. As further shown, the spacer 340 may include one or more fluid passageways 350 formed therein to permit a gas to flow through the consumables 316. During use, the linear actuating device 320 may actuate the emissive element 326 by a distance $\Delta x/\Delta v$ relative to an exit orifice 318 of the nozzle 304.

In this embodiment, the linear actuating device 320 includes a coil 352 configured to actuate the electrode 300 and emissive element 326 to control gas flow through the fluid passageway 350 and/or the exit orifice 318, as well as to control a position of the cathode 360 (e.g., the electrode 300 and the emissive element 326) relative to the anode 362 (e.g., the nozzle 304). For example, the linear actuating device 320 may be a voice coil, similar to an acoustical, speaker, or solenoid coil, that can actuate the cathode with or without an electrical insulator between the drive and the emissive element 326. Using the current drive of the coil to resist a returning element 354, such as a spring, the position of the cathode 360 can be determined by how much current is required to keep the flow of gas and arc voltage to the appropriate location for a single or multiple step process.

In some embodiments, to set the initial start position, the coil 352 can move the cathode 360 in the proper position (e.g., downward towards the nozzle 304) to close a continuity circuit between the cathode 360 and the anode 362. If there is no continuity detected, the coil 352 or solenoid can establish continuity oscillating multiple times until the oxide layer is broken up or it is determined that the cathode 360 is worn back to the point where the electrical contact between the anode 362 and the cathode 360 cannot be achieved, thus signaling end of life. In other embodiments, arc starting may also be achieved using a magnetostrictive actuator to move the emissive element 326. The magnetostrictive actuator works by running the work or pilot current through the coil 352 and expanding the electrode 300, therefore moving a mechanical linkage to position the emissive element 326 away from the anode 362.

Figure 6:
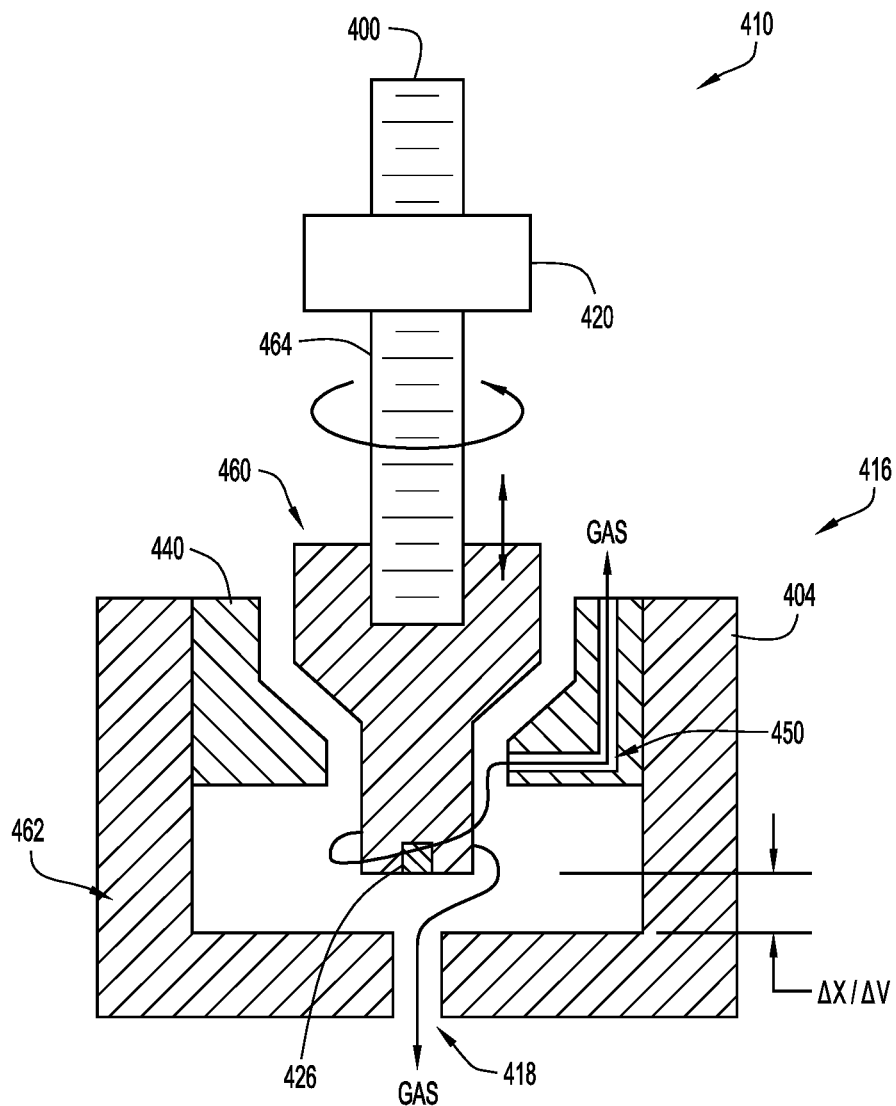
FIG. 6 is a side view of a linear actuating device and consumables of a plasma arc torch according to exemplary embodiments of the disclosure.

Referring now to FIG. 6, a side cutaway view of one or more consumables 416 of a torch 410 will be described in greater detail. As shown, the consumables 416 may include an electrode 400, a nozzle 404, and a spacer 440. The torch 410 may further include a linear actuating device 420 directly coupled to the electrode 400. As further shown, the spacer 440 may include one or more fluid passageways 450 formed therein to permit a gas to flow through the consumables 416. During use, the linear actuating device 420 may actuate the emissive element 426 by a distance $\Delta x/\Delta v$ relative to an exit orifice 418 of the nozzle 404.

In this embodiment, the linear actuating device 420 includes a linear stepper motor provided with or without an electrical insulator between the drive and an emissive element 426. Using the step count of the linear stepper motor, the position of the cathode 460 can be determined while in operation. For example, to set the initial start position, the linear stepper motor can move the cathode 460 in the proper direction (e.g., linearly downward towards the exit orifice 418) by rotating the electrode 400 using exterior steps or threading 464 to close a continuity circuit between the cathode 460 and the anode 462 (e.g., the nozzle 404). If there is no electric continuity detected, the linear stepper motor could establish electric continuity by retracting and engaging multiple times until the oxide layer is broken up or it is determined that the cathode is worn back to the point where the gap between the anode 462 and the cathode 460 is so large that it cannot be achieved by moving the cathode 460, thus signaling end-of-life. For starting the arc, there may be features in the plasma chamber that would open up a gas port, allowing for the flow of gas into the plasma chamber to be a function of the position of the cathode 460 with respect to the anode 462.

Figure 7:
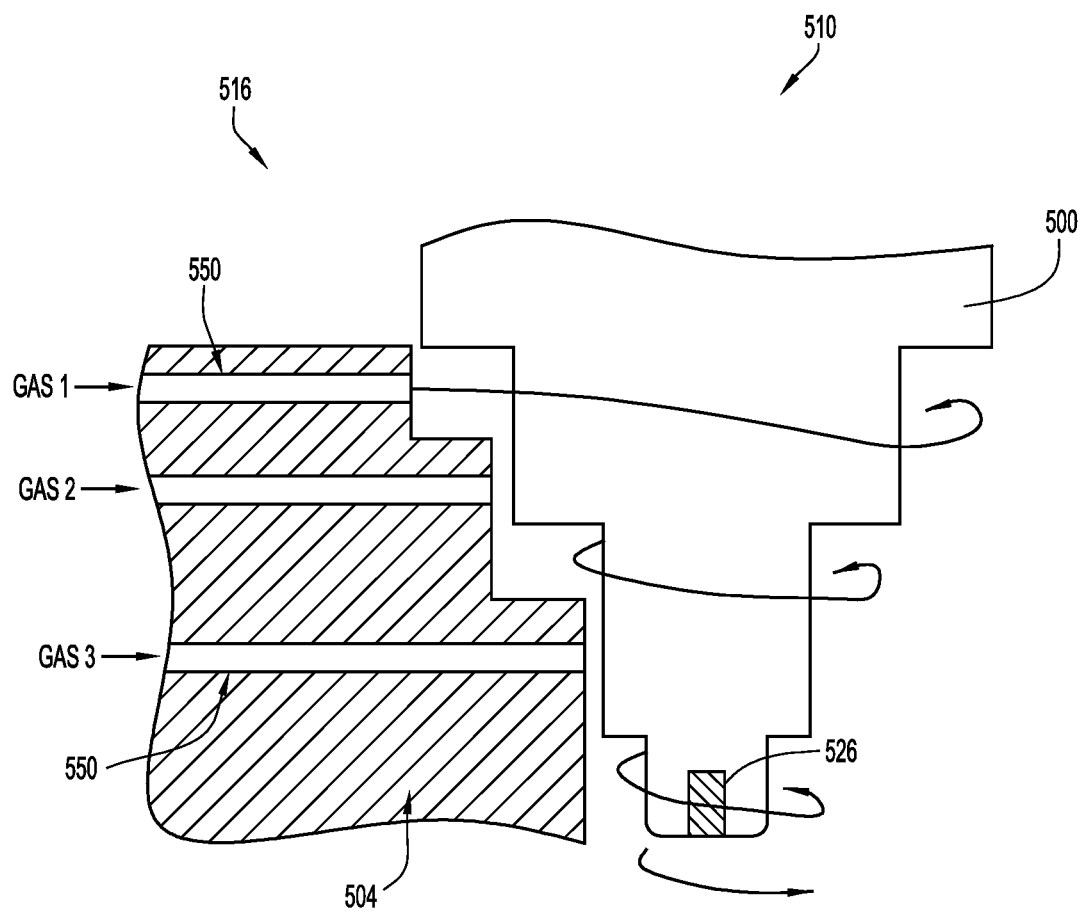
FIG. 7 is a side view of a linear actuating device and consumables of a plasma arc torch according to exemplary embodiments of the disclosure.

Referring now to FIG. 7, a side cutaway view of one or more consumables 516 of a torch 510 will be described in greater detail. As shown, the consumables 516 may include an electrode 500 and a nozzle/spacer 504. Although not shown, the torch 510 may further include a linear actuating device directly coupled to the electrode 500. As further shown, the nozzle/spacer 504 may include one or more fluid passageways 550 formed therein to permit one or more gases to flow through the consumables 516. In this embodiment, the electrode 500 may be a stepped cathode having an exterior geometry complementary to an interior geometry of the nozzle/spacer 504, which is an anode. The fluid passageways 550 are formed through the nozzle/spacer 504, for example, at an orientation perpendicular, or substantially perpendicular, to the central longitudinal axis extending through the electrode 500. In some embodiments, the gasses (e.g., gas 1, gas 2, and gas 3) are configured to swirl around the stepped features of the electrode 500 and the nozzle/spacer 504. By actuating the electrode 500 relative to the nozzle/spacer 504, the gasses may be controlled as desired.

Figure 8:
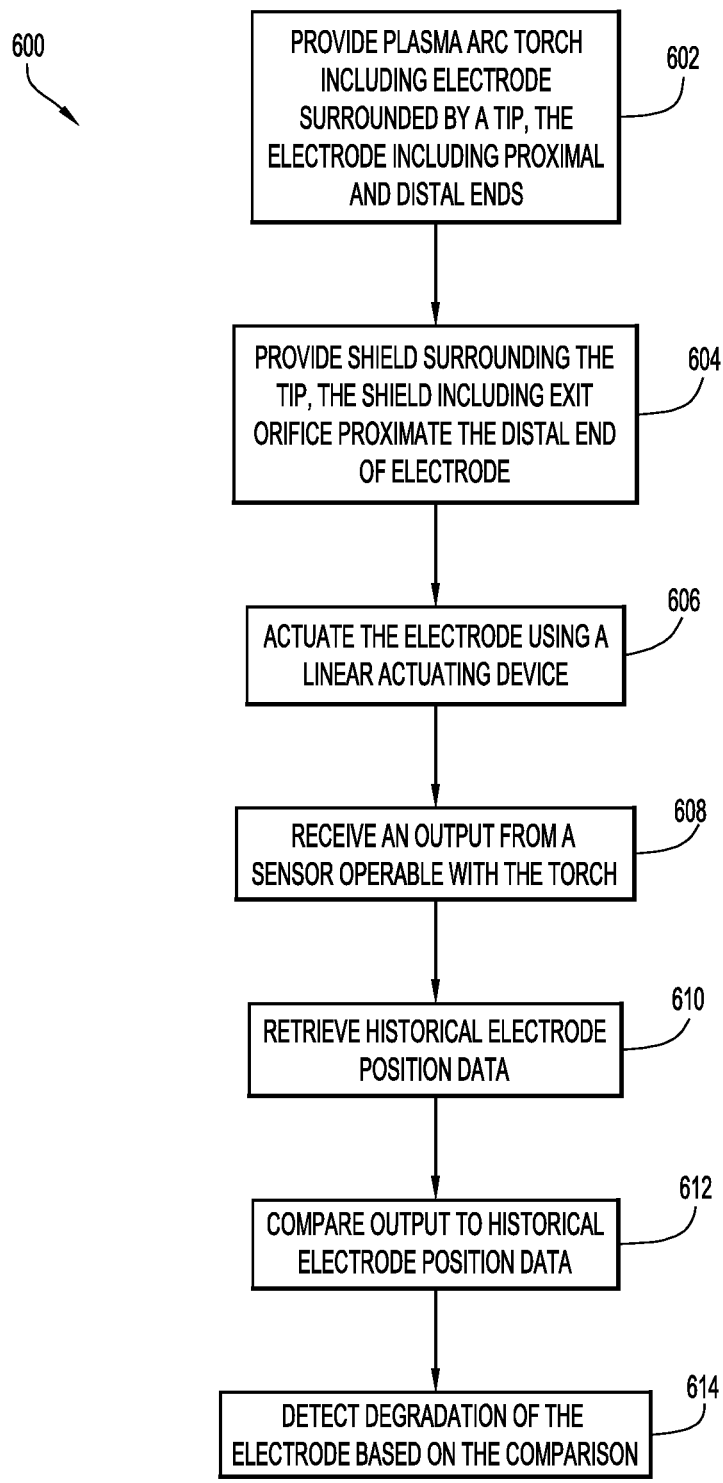
FIG. 8 is a flowchart illustrating an exemplary process according to exemplary embodiments of the disclosure.

Referring now to FIG. 8, a method 600 for actuating an electrode in a plasma arc torch according to exemplary embodiments will be described in greater detail. Method 600 may include providing a plasma arc torch including an electrode surrounded by a tip, the electrode including a proximal end and a distal end, as shown at block 602. In one embodiment, the electrode includes an emissive element disposed at the distal end. In one embodiment, the electrode is a cathode and the tip is an anode.

The method 600 may further include providing a shield surrounding the tip, the shield including an exit orifice proximate the distal end of the electrode, as shown at block 604. The method 600 may further include actuating, by a linear actuating device, the electrode along a central longitudinal axis extending through a bore of the tip, as shown at block 606. In some embodiments, the method includes actuating, relative to the shield, the emissive insert. In some embodiments, the electrode is actuated using one or more of the following linear actuating devices: a micro linear drive motor, a micro linear stepper motor, a voice coil, a solenoid coil, and a magnetostrictive actuator. In some embodiments, the method includes actuating the electrode during a welding or cutting cycle of the plasma arc torch. In some embodiments, the method includes actuating the electrode axially along a central longitudinal axis extending through a bore of a tip to bring the distal end of the electrode in contact with the tip during an arc start mode.

In some embodiments, the method 600 further includes receiving an output from a sensor operable with the plasma arc torch, as shown at block 608. In some embodiments, the output may be at least one of: a voltage generated from the electrode, and a position of the distal end of the electrode relative to the exit orifice of the shield. The method 600 further includes retrieving historical electrode position data from memory, as shown at block 610, and comparing the output to the historical electrode position data, as shown at block 612. The method 600 may further include detecting degradation of the electrode in the case the output deviates from the historical electrode position data by a predetermined amount, as shown at block 614.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:
1. A plasma arc torch comprising:
a tip surrounding an electrode, the electrode having a proximal end and a distal end;
a shield surrounding the tip, the shield including an exit orifice proximate the distal end of the electrode; and a linear actuating device coupled to the electrode for actuating the electrode such that the distal end of the electrode moves axially relative to the exit orifice of the shield, wherein the electrode is in contact with the tip during a start mode, and wherein the electrode is retracted from the tip during an operating mode, and wherein, during the operating mode, the plasma arc torch is configured to cause shield gas to pass around, but not through, the electrode.

2. The plasma arc torch of claim 1, the linear actuating device operable to actuate the electrode along a central longitudinal axis extending through the tip.

3. The plasma arc torch of claim 1, the linear actuating device including one of: a micro linear drive motor, a micro linear stepper motor, a voice coil, a solenoid coil, and a magnetostrictive actuator.

4. The plasma arc torch of claim 1, further comprising an emissive insert disposed at the distal end of the electrode.

5. The plasma arc torch of claim 2, further comprising a nozzle having one or more fluid passageways formed therein.

6. The plasma arc torch of claim 5, wherein the electrode is a stepped cathode and the nozzle is an anode, and wherein the one or more passageways formed within the anode provide a gas to the stepped cathode.

7. The plasma arc torch of claim 6, wherein the one or more passageways are oriented substantially perpendicular to the central longitudinal axis.

8. A plasma arc system comprising:
a plasma arc torch including an electrode surrounded by a tip, the electrode including a proximal end and a distal end;
a shield surrounding the tip, the shield including an exit orifice proximate the distal end of the electrode; and
a linear actuating device coupled to the electrode for adjusting a relative position between the electrode and the tip along a central longitudinal axis, wherein the central longitudinal axis extends through a central bore of the tip,
wherein, during an operating mode, the plasma arc torch is configured to cause shield gas to pass around, but not through, the electrode.

9. The plasma arc system of claim 8, the linear actuating device including one of: a micro linear drive motor, a micro linear stepper motor, a voice coil, a solenoid coil, and a magnetostrictive actuator.

10. The plasma arc system of claim 8, further comprising an emissive insert disposed within the distal end of the electrode.

11. The plasma arc system of claim 9, further comprising a nozzle, wherein the nozzle includes one or more fluid passageways formed therein.

12. The plasma arc system of claim 11, wherein the electrode is a stepped cathode and the nozzle is an anode, and wherein the one or more passageways formed within the anode provide a gas to the stepped cathode.

13. The plasma arc system of claim 8, wherein the electrode is in contact with the tip during starting of an arc, and wherein the electrode and the tip are retracted from one another during an operating mode.

14. The plasma arc system of claim 10, further comprising a control system operable with the linear actuating device, the control system comprising a sensor for determining at least one of: a voltage generated from the electrode, and a position of the distal end of the electrode relative to the exit orifice of the shield.

15. The plasma arc system of claim 14, wherein the sensor determines a position of the emissive insert.

16. The plasma arc system of claim 14, the control system further comprising memory and a processor, wherein the processor detects degradation of the electrode by comparing historical electrode position data stored in the memory to the voltage generated from the electrode or the position of the distal end of the electrode.

17. A method comprising:
providing a plasma arc torch including an electrode surrounded by a tip, the electrode including a proximal end and a distal end;
providing a shield surrounding the tip, the shield including an exit orifice proximate the distal end of the electrode; and
actuating, by a linear actuating device, the the tip along a central longitudinal axis extending through a central bore of the tip,
wherein, during an operating mode, the plasma arc torch is configured to cause shield gas to pass around, but not through, the electrode.

18. The method of claim 17, further comprising actuating, relative to the shield, an emissive insert coupled with the distal end of the electrode.

19. The method of claim 17, further comprising receiving an output from a sensor operable with the plasma arc torch, the output comprising at least one of: a voltage generated from the electrode, and a position of the distal end of the electrode relative to the exit orifice of the shield.

20. The method of claim 19, further comprising:
retrieving historical electrode position data from memory;
comparing the output to the historical electrode position data; and
detecting degradation of the electrode when the output deviates from the historical electrode position data by a predetermined amount.

21. The method of claim 17, further comprising actuating the electrode using one of the following linear actuating devices: a micro linear drive motor, a micro linear stepper motor, a voice coil, a solenoid coil, and a magnetostrictive actuator.

22. The method of claim 17, further comprising actuating the electrode during a welding or cutting cycle of the plasma arc torch.

23. The method of claim 17, further comprising actuating the tip axially along the central longitudinal axis to bring the distal end of the electrode in contact with the tip during an arc start mode.

* * * * *